(No Model.) 2 Sheets—Sheet 1.
H. A. TOBEY.
GAS METER REGISTER.
No. 487,908. Patented Dec. 13, 1892.
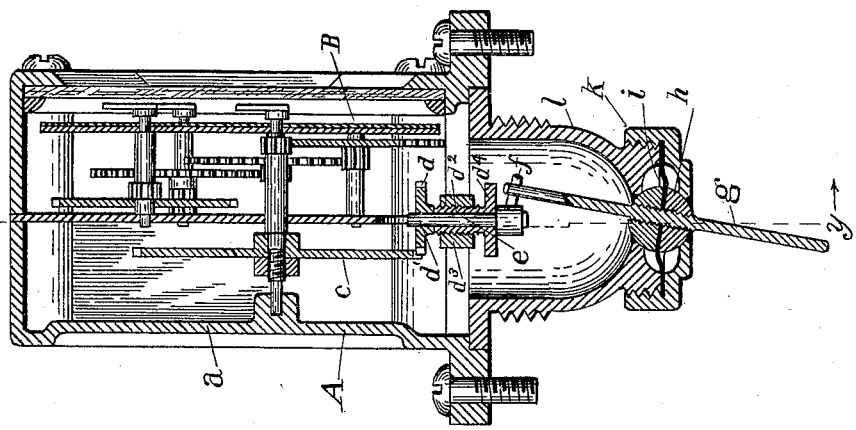
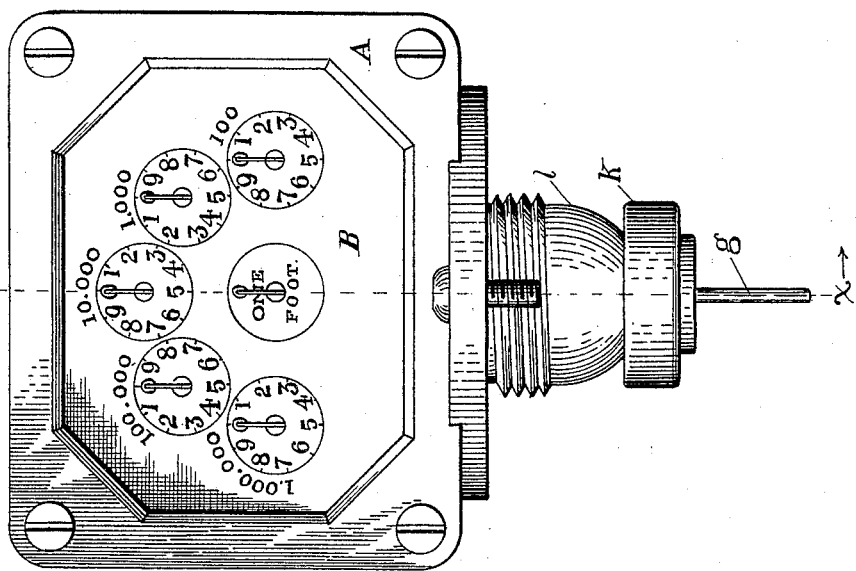
Witnesses.
David C. Walter.
Charles S. Ansley
Inventor.
Henry A. Tobey.
per Simon Hall,
His Attorney.
THE NORRIS PETERS CO., PHOTO-LITHO., WASHINGTON, D. C.

(No Model.) 2 Sheets—Sheet 2.

H. A. TOBEY.
GAS METER REGISTER.

No. 487,908. Patented Dec. 13, 1892.

Witnesses.
David C. Walter,
Isaac N. Huntsberger.

Inventor.
Henry A. Tobey
By Hinton Hall,
His Attorney.

UNITED STATES PATENT OFFICE.

HENRY A. TOBEY, OF TOLEDO, OHIO.

GAS-METER REGISTER.

SPECIFICATION forming part of Letters Patent No. 487,908, dated December 13, 1892.

Application filed October 3, 1891. Serial No. 407,620. (No model.)

*To all whom it may concern:*

Be it known that I, HENRY A. TOBEY, a citizen of the United States, residing at Toledo, Lucas county, Ohio, have invented certain new and useful Improvements in Gas-Meter Registers, of which the following is a specification.

My invention relates to mechanism designed to register the quantity of gas or other fluid passed through a meter, and more particularly to means for adjusting such mechanism to variations in the working parts of the meter to which the register is to be applied and to means for connecting the registering mechanism with the gas-chambers of the meter.

Heretofore the working parts of meters have been adjusted to conform to a registering mechanism of uniform construction.

The object of my device is to adapt the registering mechanism to be adjusted to the meter, thereby obviating the necessity of opening the meter at each adjustment, thus saving time, labor, and expense in manufacture.

Heretofore the driving-shaft of the registering device connected with the internal working parts of the meter has passed through a stuffing-box, in which is encountered the usual objectionable friction, wear, and leakage, making it necessary to construct and seal the chamber containing the registering mechanism gas-tight.

The further object of my invention is to dispense with the stuffing-box and to furnish a joint between the meter and the registering device which shall overcome these objections and which shall be durable, practically frictionless, and absolutely gas-tight.

I attain these objects by means of the mechanism hereinafter described, and shown in the accompanying drawings, made part hereof, in which—

Figure 3:
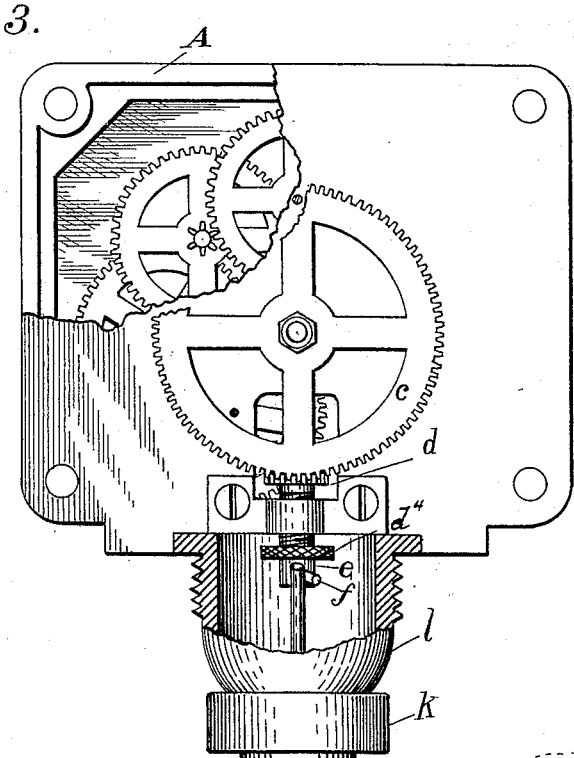
Figure 4:
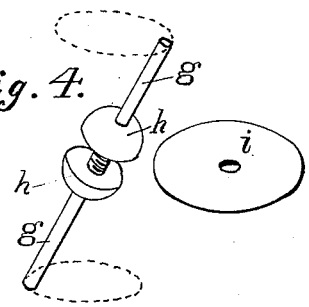

Figure 1 is a side elevation of my device; Fig. 2, a central vertical sectional view on line $xx$, Fig. 1; Fig. 3, a vertical sectional view on line $yy$, Fig. 2; Fig. 4, a view of ball-and-socket diaphragm-joint, hereinafter referred to; and Fig. 5, a central vertical sectional view of a modification of said joint, hereinafter referred to.

The same letters represent the same or like parts throughout the several views.

In the drawings, A is a casing or box containing the clockwork which drives the several indicating-hands moving over a series of dials arranged in decimal progression in the usual manner upon the face of dial-plate B. The whole train of gearing is driven by a gear-wheel $c$, engaged by a pinion $d$ upon the vertical driving-shaft $e$. Upon the lower end of the shaft $e$ is an arm $f$, projecting radially, which is engaged and driven by a staff $g$, which is operatively connected with the moving parts of the meter proper. The gear-wheel $c$ has normally, for illustration, one hundred teeth. If on "proving" the meter it is found that more gas has passed than is indicated upon the dials, gear-wheel $c$ (which may be easily removed by detaching the back plate $a$ of case A) is taken from its arbor and a wheel with a less number of teeth substituted. If, for instance, the discrepancy between the amount of gas passed and the amount registered be two per cent., a wheel with two less teeth should be substituted. If, on the other hand, the amount of gas delivered is a certain per cent. less than the amount registered, a gear-wheel $c$ is substituted, having a correspondingly-greater number of teeth, the number of teeth of gear-wheel $c$ establishing the relation between the movement of the parts of the meter and the chain of gearing actuating the hands or pointers of the several dials. When a greater or smaller gear-wheel $c$ is provided, pinion $d$ must necessarily be moved correspondingly, so that its teeth shall engage properly the teeth of gear-wheel $c$.

I provide for the adjustment of pinion $d$ as follows: Pinion $d$ is secured to shaft $d'$, which rotates in sleeve $d^2$, screw-threaded externally and movable vertically in fixed nut $d^3$. Upon the lower end of sleeve $d^2$ is a milled head $d^4$. By rotating the head $d^4$ to the right or left sleeve $d^3$ is raised or lowered, as the case may be, carrying with it shaft $d'$ and pinion $d$, which is thus made to conform to the periphery of gear-wheel $c$. Thus it will be seen that by substituting larger or smaller gear-wheels $c$ and adjusting the pinion $d$ to conform thereto the registering mechanism may be adjusted to indicate the actual quantity of gas delivered without adjustment or change of the working parts of the meter proper.

A staff or shaft $g$ passes through the center of a ball $h$, which is divided into hemispheres, one or both parts of the ball moving upon the threaded shaft as nuts upon a screw. Clasped tightly between the halves of the ball is a disk $i$ of any suitable flexible material, preferably of leather, through the center of which passes the shaft. The outer margin of the disk is clamped closely between screw-cap $k$ and the lower end of cup-like projection $l$, as shown in Fig. 2. The screw-cap $k$ and cup $l$ are bored axially, the openings forming a seat or socket in which the ball $h$ may turn and through which the shaft $g$ passes. It is obvious that the disk $i$ thus clamped at its margin and center forms a flexible diaphragm which prevents the passage of any fluid through the ball-and-socket joint formed by the sphere $h$ and its bearings and which permits the free movement of the ends of shaft $g$ in any direction, but prevents the rotation of the shaft on its own axis.

A convenient method of attaching my registering device to the meter consists in threading the exterior of cup $l$ and screwing the same into a correspondingly-threaded opening in the shell of the meter; but other means will readily suggest themselves.

One end of shaft $g$ being operatively connected with the parts of the meter, the movements of which are to be registered, the motion of the end of the shaft within the meter causes a like motion of the other end of the shaft, which motion is in the example shown communicated through arm $f$, shaft and pinion $d$ $d'$, and the usual train of gearing to the indicating hands or pointers on the dials.

Figure 5:
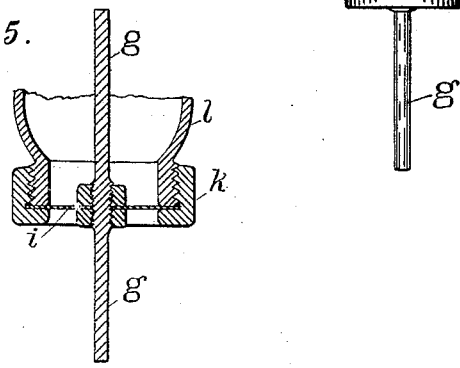

I do not limit my invention to a diaphragm in connection with a ball-and-socket joint, as described, as obviously substantially the same result may be obtained by securing the diaphragm to the shaft $g$ in any other manner that will exclude the passage of fluid between the shaft and diaphragm and dispensing with the ball and socket, leaving the shaft to be supported and guided by the diaphragm alone, as shown in the modified form of my device illustrated in Fig. 5. The ball-and-socket joint shown in Fig. 2 is, however, preferable, as it largely relieves the diaphragm from pressure from within the meter, prevents strain upon the diaphragm from the shaft, and furnishes a positive guide and support for shaft $g$.

Having fully described my invention and its construction and operation, what I claim, and desire to secure by Letters Patent, is—

1. In the train of a meter-register, a removable interchangeable driving-gear wheel, in combination with its driving-pinion, an externally-threaded sleeve forming a journal for the shaft of said pinion, and an internally-threaded support for said sleeve, substantially as shown and described, for the purpose specified.

2. In a meter-register, a diaphragm secured at its margin, two hemispheres clamping said diaphragm at or near its center between their adjacent faces, and a seat or socket for the ball formed by said two hemispheres, in combination with a shaft or staff passing through said ball and through said diaphragm, substantially as shown and described, for the purpose specified.

3. In a meter-register, a flexible diaphragm clamped at its margin, a screw-threaded shaft or staff passing through said diaphragm, two screw-threaded hemispheres on said shaft adapted to clamp said diaphragm between their adjoining faces, and a seat or socket for said two hemispheres, in combination with an adjustable pinion in the train of the register, operatively connected with said shaft or staff, substantially as shown and described, for the purpose specified.

HENRY A. TOBEY.

Witnesses:
H. T. YARYAN,
I. N. HUNTSBERGER.